(12) United States Patent
Kornienko et al.

(10) Patent No.: US 10,943,330 B2
(45) Date of Patent: Mar. 9, 2021

(54) IMAGE PROCESSING FILTER

(71) Applicant: Apical Ltd, Cambridge (GB)

(72) Inventors: Alexey Kornienko, Loughborough (GB); Yury Khrustalev, Loughborough (GB)

(73) Assignee: Apical Ltd., Cambridge (GB)

( * ) Notice: Subject to any disclaimer, the term of this patent is extended or adjusted under 35 U.S.C. 154(b) by 0 days.

(21) Appl. No.: 16/223,919

(22) Filed: Dec. 18, 2018

(65) Prior Publication Data

US 2019/0197668 A1    Jun. 27, 2019

(30) Foreign Application Priority Data

Dec. 21, 2017  (GB) ...................... 1721677

(51) Int. Cl.
*G06T 3/40* (2006.01)
(52) U.S. Cl.
CPC .................. *G06T 3/4084* (2013.01)
(58) Field of Classification Search
CPC ... G06T 3/40–3/4092; G06T 5/10; G06T 5/20
See application file for complete search history.

(56) References Cited

U.S. PATENT DOCUMENTS

| 7,782,401 B1* | 8/2010 | Chou ..................... H04N 5/208 348/581 |
| 2002/0106026 A1 | 8/2002 | Demmer |
| 2006/0140506 A1* | 6/2006 | Slavin ....................... G06T 5/10 382/275 |
| 2007/0288235 A1 | 12/2007 | Vaananen et al. |

OTHER PUBLICATIONS

Huang et al., "A Multiplierless Reconfigurable Resizer for Multi-Window Image Display", IEEE Transactions on Consumer Electronics, vol. 43, No. 3, Aug. 1997, pp. 826-832. (Year: 1997).*
Combined Search and Examination Report dated Jun. 19, 2018 for Application No. GB1721677.1.

* cited by examiner

*Primary Examiner* — Brian Werner
(74) *Attorney, Agent, or Firm* — EIP US LLP

(57) ABSTRACT

Examples of the present disclosure relate to an image processing apparatus comprising a filter to convert a first image data signal into an output image data signal. The filter is configured to resample the first image data signal, having a first sample rate, by a resampling factor, such that the output image data signal has an output sample rate that is different to the first sample rate. The filter is also configured to apply a phase alteration to the first image data signal to compensate a group delay in the first image data signal.

20 Claims, 7 Drawing Sheets

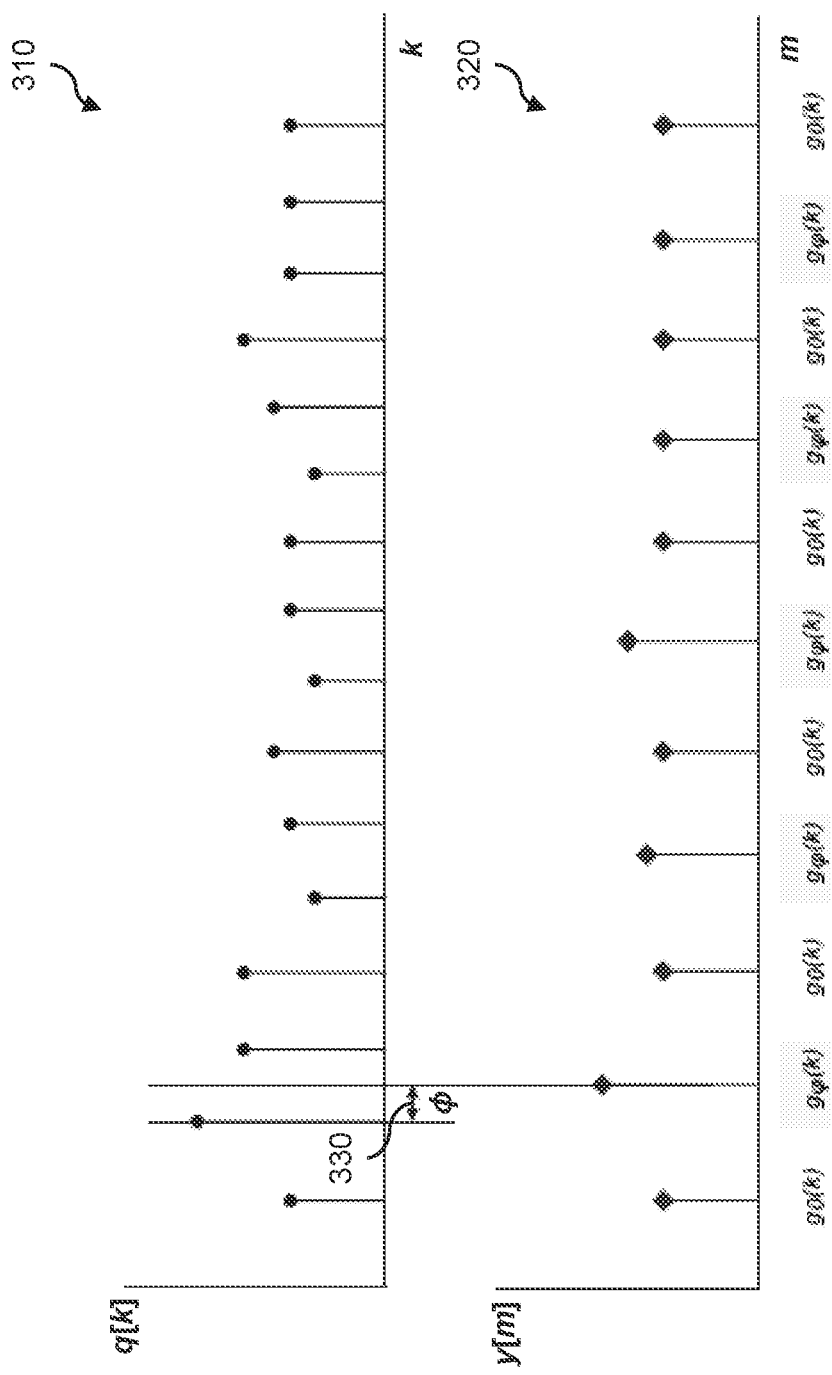

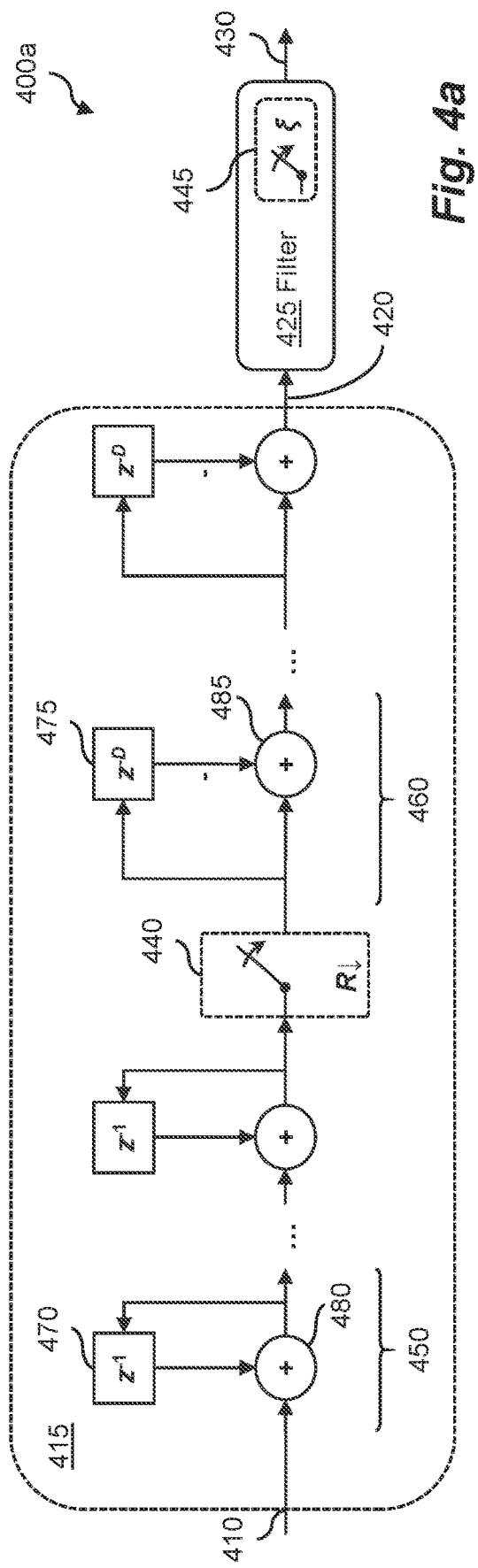
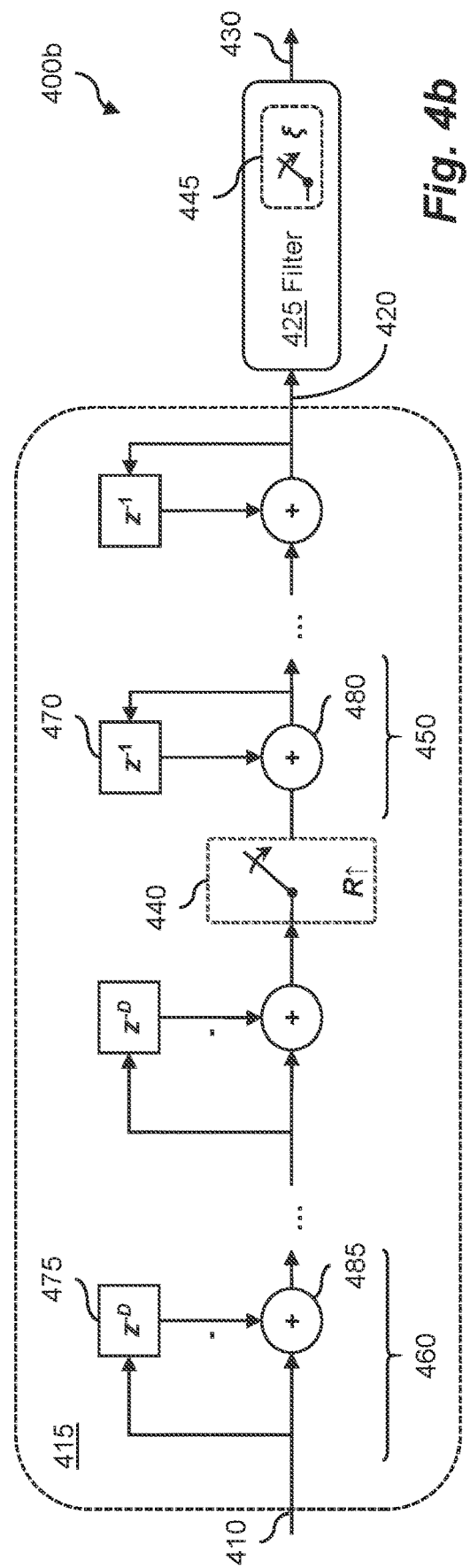
Fig. 4a
Fig. 4b

IMAGE PROCESSING FILTER

CROSS-REFERENCE TO RELATED APPLICATIONS

This application claims the benefit under 35 U.S.C. § 119(a) and 37 CFR § 1.55 to United Kingdom patent application no. GB 1721677.1, filed on Dec. 21, 2017, the entire content of which is incorporated herein by reference.

BACKGROUND OF THE INVENTION

Field of the Invention

The present invention disclosure relates to filtering image data signals.

Description of the Related Technology

An image data signal, representing an image, can include a set of samples which may have been originally obtained by sampling analogue information constituting an image, for example using an image sensor. The set of samples may correspond to a two-dimensional array of pixels. A sample rate, or sampling frequency, of the image data signal may correspond to a number of samples per unit length in the image data.

Sample rate conversion, or "resampling", techniques may be applied to an image data signal to change the sample rate of the image data. Such resampling techniques are applicable in image scaling, where an input digital image may be scaled up to generate an output digital image with a larger number of pixels, or scaled down to generate an output digital image with a smaller number of pixels. Image scaling may be applied before outputting an image data signal, for example to make the outputted image data suitable for display on a particular display device. Other applications include digital zoom, where an up-scaled portion of the image may be displayed, and generating multiple versions of an image having different resolutions, for example outputting the original image along with a down-scaled thumbnail thereof.

Digital filtering may be applied to the image data signal when resampling, for example scaling, the digital image. The filtering may generate output samples, or pixels, of the output digital image that are each based on a plurality of input samples (pixels) of the input digital image.

It is desirable to provide improved filters and filtering methods for resampling an image data signal, which are for example architecturally and computationally more efficient, and/or which improve the image quality of the resampled image data signal relative to other filters and filtering methods.

SUMMARY

In a first embodiment, there is provided an image processing apparatus comprising a filter to convert a first image data signal into an output image data signal, the filter configured to:
resample the first image data signal, having a first sample rate, by a resampling factor, such that the output image data signal has an output sample rate that is different to the first sample rate; and
apply a phase alteration to the first image data signal to compensate a group delay in the first image data signal.

In a second embodiment, there is provided an image processing method comprising:
resampling a first image data signal, having a first sample rate, by a resampling factor to generate an output image data signal having an output sample rate that is different to the first sample rate; and
applying a phase alteration to the first image data signal to compensate a group delay in the first image data signal.

In a third embodiment, there is provided an image processing apparatus comprising a cascaded integrator-comb filter to convert an input image data signal into an output image data signal,
wherein the cascaded integrator-comb filter is configured to resample the input image data signal, having an input sample rate, by a resampling factor, such that the output image data signal has an output sample rate that is different to the input sample rate.

BRIEF DESCRIPTION OF THE DRAWINGS

FIG. 3 shows a schematic representation of an input sequence and an output sequence for a polyphase filter, according to examples.

FIGS. 4a and 4b show schematic representations of a filter arrangement according to examples.

DETAILED DESCRIPTION OF CERTAIN INVENTIVE EMBODIMENTS

Details of the apparatuses and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
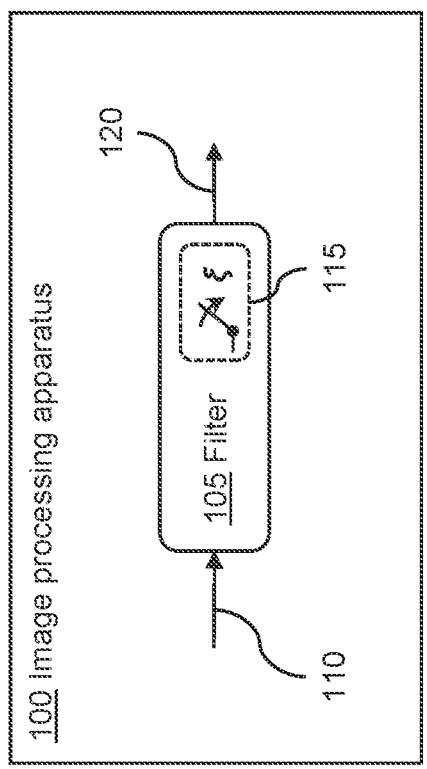
FIG. 1 shows a schematic representation of an image processing apparatus comprising a filter, according to examples.

FIG. 1 schematically illustrates an image processing apparatus 100 comprising a filter 105. The filter 105 is to convert a first image data signal 110, for example received by the filter 105, into an output image data signal 120, for example outputted by the filter 105. Specifically, the filter 105 is configured to resample the first image data signal 110, having a first sample rate, by a resampling factor, e.g. $\xi$, such that the output image data signal 120 has an output sample rate that is different to the first sample rate. The filter 105 is also configured to apply a phase alteration to the first image data signal 110 to compensate a group delay in the first image data signal 110.

In examples, a determination of the group delay in the first image data signal 110 may be made by the filter 105 or another component of the image processing apparatus 100. The filter 105 may then apply the phase alteration to the first image data signal 110 based on the determination of the group delay.

The group delay $\tau_g$ of a signal may be considered to be the derivative of a phase, or phase shift, $\phi$ of the signal with respect to a frequency f of the signal, i.e. $\tau_g=-d\phi/df$. As the group delay is phase dependent, the filter 105 may apply a phase alteration to the first image data signal 110 in order to compensate the group delay, or a component thereof, inherent in the first image data signal 110. For example, the filter 105 may adjust the phase $\phi$ of the first image data signal 110 in order to make a corresponding adjustment to the group delay $\tau_g$ of the first image data signal 110 when converting it into the output image data signal 120.

In examples where the group delay $\tau_g$ of the first image data signal 110 is a non-integer value, i.e. comprises a fractional part, the filter 105 may apply the phase alteration to shift the group delay $\tau_g$ of the first image data signal 110 to a nearest integer value. For example, the filter 105 may introduce an intermediate group delay $\vartheta$ to the first image data signal 110, having its own group delay $\tau_g$, to give an output group delay ($\vartheta+\tau_g$) of the output image data signal 120 that is an integer value.

Non-integer group delay $\tau_g$ in an image data signal may cause undesirable characteristics when an image represented thereby is viewed, e.g. on an electronic visual display. For example, in the spatial domain of the image data, non-integer group delay $\tau_g$ may cause undesirable artefacts in the displayed image. Examples of such undesirable artefacts include blurring, distortion and/or spatial displacement of features in the image. Applying the phase alteration to the first image data signal 110 to compensate the group delay $\tau_g$ thereof, e.g. to shift the group delay $\tau_g$ of the first image data signal 110 to a nearest integer value, may therefore improve image quality in the image represented by the output image data signal 120.

The filter 105 may implement a sample rate changer 115, e.g. an up-sampler or a down-sampler, to resample the first image data signal 110 by the resampling factor $\xi$, as shown in FIG. 1. A sample rate changer may be known as a "sample rate converter" in alternative nomenclature.

An up-sampler that is configured to increase the sampling rate of (or "up-sample") the first image data signal 110 by the resampling factor $\xi$ may insert $\xi-1$ zero-valued samples between consecutive samples in the first image data signal 110. A down-sampler that is configured to decrease the sampling rate of (or "down-sample") the first image data signal 110 by the resampling factor $\xi$ may retain only every $\xi$th sample of the first image data signal 110, discarding all other samples.

Figure 2:
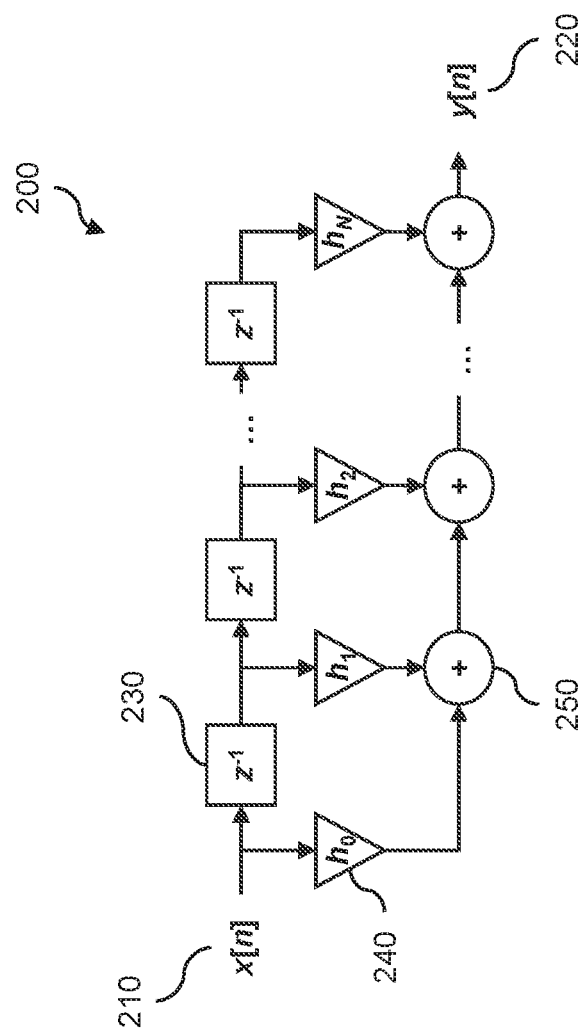
FIG. 2 shows a schematic representation of a finite impulse response filter according to examples.

In some examples, the filter 105 may include a finite impulse response (FIR) filter. FIG. 2 shows schematically an example FIR filter 200 configured to convert an input signal x[n] 210 into an output signal y[n] 220. The FIR filter 200 includes a plurality of delay elements 230. Each delay element 230 may apply a unit delay to the input signal x[n] 210. Each unit delay may be considered a $z^{-1}$ operator in Z-transform notation.

The FIR filter 200 also includes a plurality of multipliers 240, each configured to multiply its input signal by a respective coefficient $h_0, h_1, h_2, \ldots, h_N$. A plurality of addition elements 250 (or "adders") are each configured to add its multiple inputs. The FIR filter 200 of FIG. 2 may be said to be of order N, having M "taps", where M=N+1.

The output sequence y[n] for the Nth order causal discrete FIR filter 200 of FIG. 2 may be computed as a weighted sum of a set of input samples:

$$y[n] = \sum_{k=0}^{N} h_k \cdot x[n-k],$$

where the weightings $h_k$ are the coefficients of the FIR filter 200, as described. The x[n–k] terms in this summation are the taps of the FIR filter 200: there are M such terms in the summation. This computation may be considered a discrete convolution, expressed as y[n]=h[k]*x[n]. The coefficients $h_k$ of a (direct form) FIR filter 200 are equivalent to the impulse response h[k] of the FIR filter 200.

The impulse response of a given filter may be considered to be the output sequence outputted by the given filter when its input sequence is an impulse sequence, i.e. a single unity-valued sample with a series of zero-valued samples before and after.

The discrete Fourier transform (DFT) of the convolution expression given above gives the relationship Y(f)=H(f)·X(f) between the output spectrum Y(f) and the frequency response H(f) of the filter, and the input spectrum X(f), all of which are in the spatial frequency f domain. The frequency response H(f), which is the DFT of the impulse response h[k] of a filter, may be considered a characteristic of the filter. The frequency response H(f) is often expressed, and represented versus spatial frequency f, as a magnitude frequency response |H(f)|.

In certain examples, the filter 105 includes an FIR filter, and the intermediate group delay $\vartheta$ introduced to the first image data signal 110 by the filter 105 may include a component associated with the FIR filter. For example, the intermediate group delay may be $\vartheta=M-1/2+\delta$, for an odd number M of taps in the FIR filter. The filter 105 may apply the alteration $\delta$, e.g. having a value in the range −0.5 to 0.5, such that the output group delay ($\vartheta+\tau_g$) of the output image data signal 120 is an integer value, as described above.

In some examples, the FIR filter included in the filter 105 may be asymmetric. A symmetric FIR filter may be considered to have a set of coefficients $h_k$ that have symmetric values about a central coefficient in the set of coefficients. The central coefficient may have the highest value in the set of coefficients. For an example symmetric FIR filter having five coefficients $\{h_0, h_1, h_2, h_3, h_4\}$, the coefficients $h_0$ and $h_4$ may be equal in value, as may the coefficients $h_1$ and $h_3$. This is not the case for asymmetric FIR filters, where $h_0$ and $h_4$ may have different values, as may $h_1$ and $h_3$, in the given five-tap example. Thus, in an asymmetrical FIR filter, coefficient pairs at symmetrical positions about a central coefficient in the set of coefficients may have different values.

Therefore, in examples, symmetry of the FIR filter, as part of the filter 105, may be compromised in order to give an output group delay ($\vartheta+\tau_g$) of the output image data signal 120 that has an integer value. Asymmetry of the FIR filter may contribute to group delay 'ripple' within a passband of the filter 105, e.g. a frequency band within which signals are transmitted by the filter 105 without attenuation. However, relatively low values of the alteration $\delta$ applied by the filter 105, e.g. of a magnitude less than or equal to 0.5, may reduce such group delay ripple within the passband.

In some examples, the filter 105 includes a polyphase filter having a plurality of sub-filters at different phases. The polyphase filter may be an FIR filter. Each sub-filter in the plurality of sub-filters may have a respective phase. A given sub-filter may be configured to apply the phase alteration, corresponding to its respective phase, to the first image data signal 110 to compensate a non-integer group delay in the first image data signal 110. Compensating the non-integer group delay may include shifting the group delay present in the first image data signal 110 to a nearest integer value, as described in other examples.

FIG. 3 schematically shows an example input sequence q(k) 310 and output sequence y(m) 320 for a polyphase filter, to illustrate the principle of polyphase sample rate conversion in the space domain. The output signal y(m) 320 at a given sample point m may be calculated based on a convolution of a corresponding phase-shifted sub-filter $g_\phi(u)$ with the input signal q(k) 310:

$$y(m) = \sum_{v=0}^{Q-1} h(v-\phi)q(n+\phi-v) = \sum_{u=0}^{Q-1} g_\phi(u)q(\lfloor m_\xi \rfloor - u),$$

such that different output values y(m) are calculated with different compensation filters $g_\phi(u)$, where $\phi=\phi(m)$. The parameter Q in the equation represents a number of coefficients, or taps, in each compensation sub-filter $g_\phi(u)$. In this example, the polyphase filter is configured to down-sample the input signal q(k) 310 by the resampling factor $\xi$. In some examples, the polyphase filter may include a number of sub-filters $g_\phi(u)$ equal to the resampling factor $\xi$.

In the equation above for calculating the output signal y(m) 320 of a polyphase filter at a given sample point m, h(v) may represent a prototype filter, at phase $\phi=0$, for the polyphase filter. The sum expression on the right-hand side of the equation follows from a change of variable from v in the sum expression on the left-hand side to u, where u=v−$\phi$. This change of variable accounts for the phase shift $\phi$ 330, associated with the sub-filter $g_\phi(u)$ at phase $\phi$, as shown in FIG. 3.

Returning to FIG. 1, the filter 105, as described in examples, may receive the first image data signal 110 as the output of some previous image processing, e g implemented as part of an image processing pipeline. The previous image processing may be implemented by other components of the image processing apparatus 100 or by another image processing apparatus, for example. The first image data signal 110 may therefore have attained a group delay as a result of the previous image processing, for example filtering by another filter, earlier in the pipeline.

FIGS. 4a and 4b show respective examples of a filter arrangement or "filter system" 400a, 400b, which includes the filter of previous examples, e.g. the filter 105 described with reference to FIG. 1, as a second filter 425. The filter arrangement 400a, 400b also includes a first filter 415 to convert an input image data signal 410 into an intermediate image data signal 420. The intermediate image data signal 420 may correspond to the first image data signal in previous examples. The filter arrangement 400a, 400b may be part of an image processing apparatus, e.g. the image processing apparatus 100 as previously described for the filter of previous examples.

The second filter 425 is configured to receive the intermediate data signal 420 from the first filter 415 and to convert the intermediate image data signal 420 into an output image data signal 430. The output image data signal 430 may correspond to the output image data signal 120 in previous examples.

The first filter 415 may be configured to resample the input image data signal 410, having an input sample rate, by a first resampling factor, e.g. R, such that the intermediate sample rate of the intermediate image data signal 420 is different to the input sample rate. For example, the intermediate sample rate of the intermediate image data signal 420 may be scaled, by the first resampling factor R, relative to the input sample rate. The first filter may include a sample rate changer 440, such as an up-sampler or down-sampler, to change the input sample rate by the first resampling factor R, e.g. to increase or decrease the input sample rate by the value of the first resampling factor R.

The second filter 425 may be configured to resample the intermediate image data signal 420, having the intermediate sample rate, by a second resampling factor, e.g. $\xi$, such that the output sample rate of the output image data signal 430 is different to the intermediate sample rate. For example, the output sample rate of the output image data signal 430 may be scaled, by the second resampling factor $\xi$ relative to the intermediate sample rate. The second filter may include a sample rate changer 445, such as an up-sampler or down-sampler, to change the intermediate sample rate by the second resampling factor $\xi$, e.g. to increase or decrease the intermediate sample rate by the value of the second resampling factor $\xi$. The intermediate sample rate and second resampling factor $\xi$ may correspond, respectively, to the first sample rate and the resampling factor $\xi$ in previous examples.

In cases where the first and second filters 415, 425 are both configured to either down-sample or up-sample the respective image data signal it receives, the output image data signal 430 may be resampled, relative to the input image data signal 410, by a factor $\chi$ comprising a product of the first and second resampling factors: $\chi=R\xi$. The first and second resampling factors may therefore be considered as first and second resampling sub-factors, respectively.

In the example filter arrangement 440a shown in FIG. 4a, the first filter 415 includes a down-sampler 440 to down-sample the input image data signal 410 by the first resampling sub-factor R, and the second filter 425 is configured to down-sample the intermediate image data signal 420 by the second resampling sub-factor $\xi$. In this example, the output sample rate may therefore be the input sample rate divided by the factor $\chi$ comprising the product of the first and second resampling sub-factors: $\chi=R\xi$.

In the example filter arrangement 440b shown in FIG. 4b, the first filter 415 includes an up-sampler 440 to up-sample the input image data signal 410 by the first resampling sub-factor R, and the second filter 425 is configured to up-sample the intermediate image data signal 420 by the second resampling sub-factor $\xi$. In this example, the output sample rate may therefore be the input sample rate multiplied by the factor $\chi$ comprising the product of the first and second resampling sub-factors: $\chi=R\xi$.

In some examples, the first resampling sub-factor R is an integer, and the second resampling sub-factor $\xi$ includes a fractional part. For example, it may be desirable to resample the input image data signal 410 by a target resampling factor $\chi$ that includes a fractional part: e.g. the target resampling factor $\chi$ may be a non-integer value. The target resampling factor $\chi$ may thus be decomposed, using the filter arrangement examples 400a, 400b, into the integer first resampling sub-factor R and the non-integer second resampling sub-factor $\xi$, which includes the fractional part. In some examples, the non-integer second resampling sub-factor $\xi$ has a value between 1 and 2, i.e. $1<\xi<2$.

In examples of the filter arrangement or "composite filter" 400a, 400b, which may be part of an image processing apparatus, the first filter 415 may include a cascaded integrator-comb (CIC) filter, as shown in FIGS. 4a and 4b. The CIC filter 415 includes one or more integrator filter elements 450 and one or more comb filter elements 460. There may be the same number of integrator and comb filter elements, or "stages".

Each integrator filter element 450 includes a delay element 470 and an addition element, or "adder" 480. The delay element 470 of the integrator 450 may apply a unit delay to its input image data signal. Each unit delay may be considered a $z^{-1}$ operator in Z-transform notation, as previously described with reference to the example FIR filter 200 shown in FIG. 2. Each integrator 450 may operate to add its previous output sample, e.g. y[n−1], to the current input sample, e.g. x[n], in the input sequence.

Each comb element 460 includes a delay element 475, which may apply a number D of unit delays to its input image data signal. The delay element 475 may thus be implemented by a series of D unit delay elements in some examples. The number D of unit delays applied by the delay element 475 may be referred to as the "delay length" or "differential delay" of the comb filter element 460, measured as a number of samples. In Z-transform notation, the delay element 475 may be considered a $z^{-D}$ operator, as shown in FIGS. 4a and 4b. Each comb element 460 also includes a subtraction element, or "subtractor" 485, to subtract the delayed input sample, e.g. x[n−D], from the current input sample, e.g. x[n]. Each comb element 460 may therefore be described by the difference equation y[n]=x[n]+x[n−D].

The CIC filter 415 may include a sample rate changer 440, e.g. a down-sampler or up-sampler, as part of its architecture. FIG. 4a shows an example of the filter arrangement 400a including the CIC filter 415 having a down-sampler, or decimator, arranged between the integrator filter elements 450 and comb filter elements 460. The down-sampler may be configured to down-sample its input signal by the first resampling sub-factor R, e.g. by discarding all but every Rth sample from its input sequence, as denoted by the R↓ operation of the sample rate changer 440 shown in FIG. 4a.

FIG. 4b shows an example of the filter arrangement 400b including the CIC filter 415 having an up-sampler, or interpolator, arranged between the comb filter elements 460 and integrator filter elements 450. The up-sampler may be configured to up-sample its input signal by the first resampling sub-factor R, e.g. by inserting R−1 zero-valued samples between each sample in its input sequence, as denoted by the R↑ operation of the sample rate changer 440 shown in FIG. 4b.

The CIC filter 415, when arranged to down-sample the input image data signal 410 may include one or more integrator filter elements 450 followed by a downs-sampler 440 followed by one or more comb filter elements 460, as shown in FIG. 4a. When the CIC filter 415 is arranged to up-sample the input image data signal 410, the one or more integrator filter elements 450 and the one or more comb filter elements 460 may be swapped in order. For example, the comb filter elements 460 may be arranged on the side of the CIC filter 415, e.g. about the sample-rate changer 440, that is operating at a lower sample rate. This may reduce storage requirements associated with the delay elements 475 of the comb filter elements 460.

Compared to other types of FIR filter, e.g. the example FIR filter 200 of FIG. 2, the CIC filter 415 utilises delay, addition and subtraction elements only. There are no multipliers having associated coefficients, e.g. for multiplying the input samples by, in the CIC filter 415. Thus, compared to general FIR filters, the CIC filter 415 may exhibit improved architectural and computational efficiency. For example, the CIC filter 415 may have lower storage requirements, as multiplicative coefficients are not stored, and lower processing requirements, as there are no multiplication operations. Furthermore, where the resampling factor applied by the sample rate changer of the CIC filter 415 is relatively large, e.g. greater than 9, the computational requirements may be much lower than an equivalent tapped-delay line FIR filter, e.g. having the structure of the example FIR filter 200 of FIG. 2, configured to resample by the same resampling factor.

Architectural and computational efficiency improvements may also be realised by truncating the image data of an image data signal as it passes through the CIC filter 415. An example implementation of this technique is described herein with reference to FIG. 5, which shows an example CIC filter 515, having a number S of integrator filter elements 550 and a corresponding number S of comb filter elements 560. The CIC filter 515 may be implemented as the CIC filter 415 described in previous examples with reference to FIGS. 4a and 4b.

Figure 5:
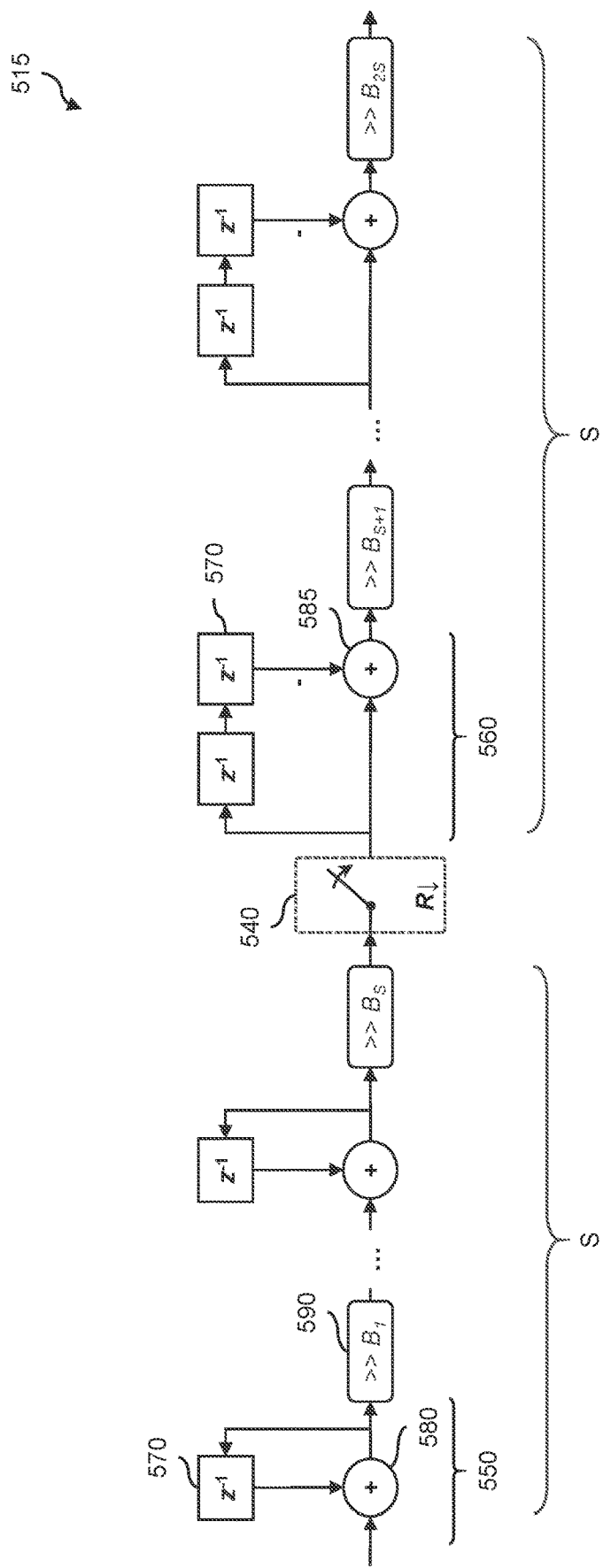
FIG. 5 shows a schematic representation of a cascaded integrator-comb filter according to examples.

Components of the CIC filter 515 of FIG. 5 that are similar to or the same as corresponding features of the CIC filter 415 of FIGS. 4a and 4b are labelled with the same reference numerals incremented by 100; corresponding descriptions should be taken to apply. For example, each integrator filter element 450 includes a delay element 570 and an adder 580, as previously described, and each comb element 560 includes a series of one or more unit delay elements 570 and a subtractor 485, as previously described. In the example CIC filter 515 shown in FIG. 5, each comb element 560 includes a series of two unit delay elements 570, i.e. the differential delay of each comb filter is 2, or D=2.

The example CIC filter 515 is configured to truncate a respective number of bits $B_j$ from a given image data signal after processing the given image data signal by each of the integrator and comb elements, 550, 560. The number of bits $B_j$ truncated from the image data signal may depend on which stage j=1, 2, ..., 2S of the CIC filter 515 the given image data signal has been outputted from. For example, the CIC filter 515 of FIG. 5 includes a truncation element 590, or "truncator", after each stage j=1, 2, ..., 2S to truncate the image data signal outputted by the preceding stage of the CIC filter 515.

The respective number of bits $B_j$ may be based on the number S of comb filter elements, the first resampling sub-factor R, and the differential delay D applied by each comb element. Mathematically, the respective number of bits $B_j$ truncated after stage j of the CIC filter 515 may be expressed as $$B_j = \left\lfloor \Delta B_{max} - 1 - \frac{1}{2}\log_2\left(\frac{SF_j^2}{2}\right) \right\rfloor,$$

where $\Delta B_{max} = \lceil S \log_2(RD) \rceil$, and $F_j^2 = \Sigma_k h_j^2(k)$, where:

$$h_j(k) = \sum_{l=0}^{L(k)} (-1)^l \binom{S}{l}\binom{S-j+k-RDl}{k-RDl},$$

for j=1, 2, . . . , S where L(k)=⌊k/RD⌋ and 0≤k≤(RD−1)S+j−1; and $$h_j(k) = (-1)^k \binom{2S+1-j}{k},$$

for j=S+1, S+2, . . . , 2S and 0≤k≤2S+1−j. The lower and upper square brackets are floor and ceiling operators, respectively.

Truncating a number $B_j$ of least significant bits (LSB) from the image data signal may reduce the memory requirements of the CIC filter 515, for example when implementing the CIC filter 515 to process an image data signal, as part of an image processing apparatus.

Returning to FIG. 4a, where the decimating CIC filter 415 is implemented to down-sample the input image data signal 410 by the first resampling sub-factor R, the gain G of the CIC filter 415 may be given by G=(RD)$^S$, where D is the differential delay applied by each comb section 460, and S is the number of comb stages 460 (equal to the number of integrator stages 450) in the CIC filter 415. The gain of a given filter, which receives an input signal and outputs an output signal, may be considered as the ratio of the respective amplitudes of the output and input signals. It is often expressed in logarithmic decibel (dB) units, e.g. G=10 log$_{10}$(A$_{out}$/A$_{in}$)dB, where A$_{in}$ and A$_{out}$ are the input and output amplitudes of the processed signal, respectively.

The magnitude frequency response of the decimating CIC filter 415 may be expressed as $$|H(f)| = \left| \frac{\text{sinc}(fD)}{\text{sinc}(f)} \right|^S,$$

where f is the output spatial sampling frequency of the intermediate image data signal 420 as outputted by the last of the S comb filter elements 460 in the CIC filter 415.

Figure 6:
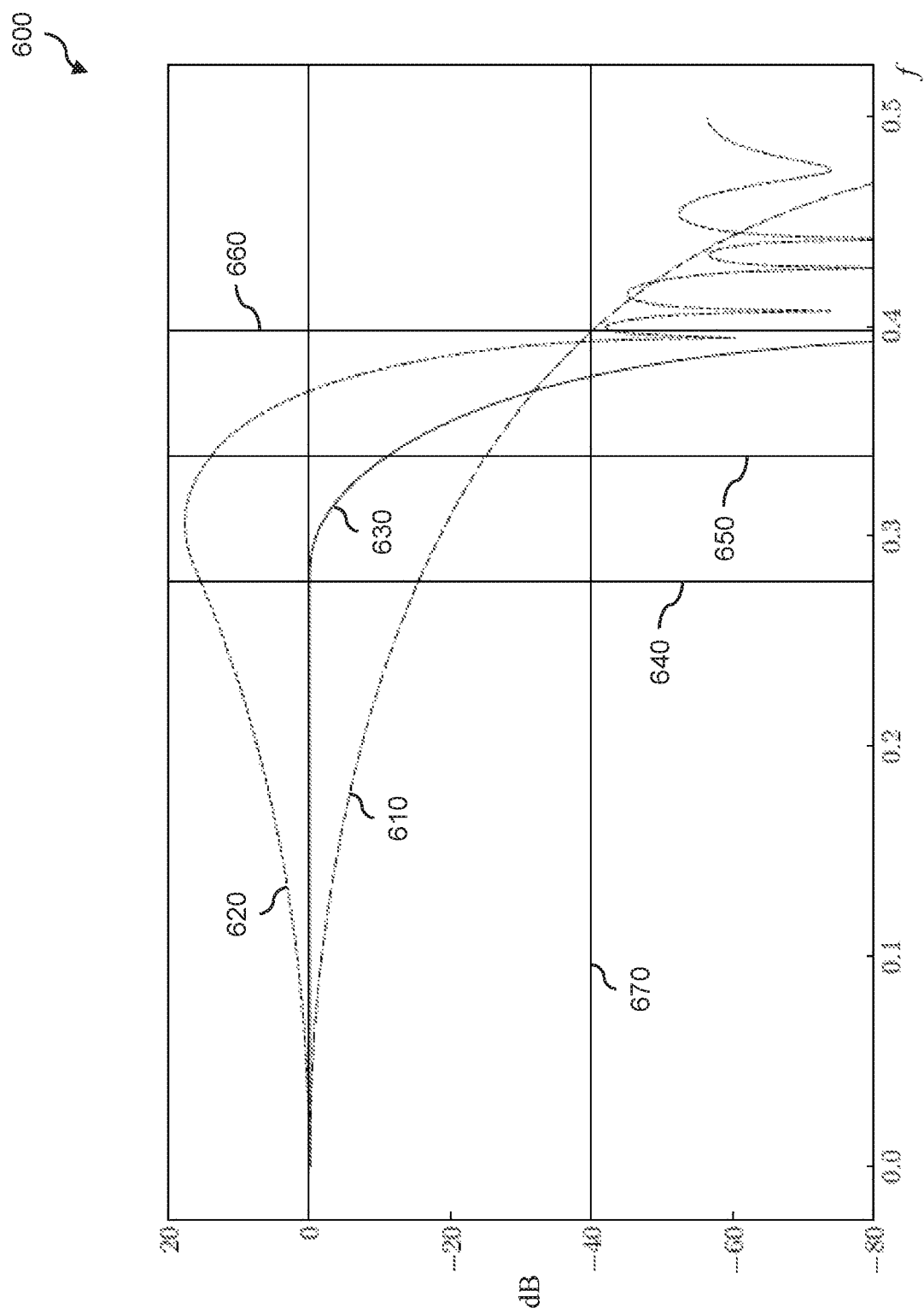
FIG. 6 shows a graphical representation of magnitude frequency responses for different filters, according to examples.

FIG. 6 shows a graphical representation 600 including the magnitude frequency response 610 of the example decimating CIC filter 415 plotted against normalised spatial frequency f of the final output image data signal. As shown in FIG. 6, the magnitude frequency response 610 of the decimating CIC filter 415 drops within the desired passband f<f$_{pass}$ 640 of the filter system 400a. Thus, an input image data signal 410 may be attenuated in the passband by the CIC filter 415, and the attenuation may be frequency-dependent, which may be undesirable for a sample rate conversion filter.

The second filter 425 may therefore be configured to provide a second magnitude frequency response 620 which comprises an inverse of the CIC magnitude frequency response 610 over the passband frequency range, i.e. f<f$_{pass}$ 640. The resulting magnitude frequency response 630 of the filter system 400a may thus have a flatter profile over the passband frequency range f<f$_{pass}$ 640.

In examples, the second filter 425 may be configured to provide a second magnitude frequency response 620 which includes an inverse, over a given frequency range, of a first magnitude frequency response associated with a given first filter 415, e.g. which produces undesirable attenuation in the given frequency range.

The second filter 425 may additionally or alternatively be configured to produce a gain which compensates, e.g. complements, the gain G of the CIC filter 415 described above.

In examples, the second filter 425 is configured to down-sample the intermediate image data signal 420 by the second resampling sub-factor ξ. A stopband frequency 650 may be defined for the CIC filter 415 based on the second resampling sub-factor ξ: f$_{stop}$=1/2ξ. The CIC filter 415 may be configured to remove frequencies greater than the stopband frequency 650, f>f$_{stop}$, from the intermediate signal 420. In certain examples, the number of integrator and comb stages S may be set so that attenuation in the stopband f>f$_{stop}$ by the CIC filter 415 is at least the target attenuation 670.

A cut-off frequency f$_c$ 660 may be defined as a spatial frequency at which the magnitude frequency response 610 of the CIC filter 415 reaches the target attenuation 670, e.g. −40 dB in the example shown in FIG. 6. The passband and cut-off frequencies f$_{pass}$, f$_c$ of the second filter 425 may be set at equidistant values from the stopband frequency f$_{stop}$ value of the CIC filter 415.

In some examples, the second magnitude frequency response 620 of the second filter 425 may additionally or alternatively be configured to be attenuated by at least the target attenuation 670 at frequencies above the cut-off frequency f$_c$ 660. The second filter 425 may be configured to reduce ripple of the second magnitude frequency response 620 in the passband f<f$_{stop}$ of the CIC filter 415.

The group delay of the CIC filter 415 may be expressed as τ$_g$=S(RD−1)/2R, where S is the number of comb (and integrator) filter elements 460, R is the first resampling sub-factor, and D is the differential delay applied by each comb filter element 460. The group delay τ$_g$ may have the same value for all frequencies of the input image data signal 410, i.e. it may be frequency-independent. Thus, the second filter 425 may be configured to apply a phase alteration to the intermediate image data signal 420, as previously described, to compensate the group delay τ$_g$ in the intermediate image data signal 420 outputted by the CIC filter 415. For example, the CIC filter 415 may introduce a non-integer group delay τ$_g$ in the intermediate image data signal 420, which may cause a decrease in image quality, e.g. undesirable artefacts, in the image represented by the intermediate image data signal 420. The second filter 425 may therefore be configured to apply a phase alteration to the intermediate image data signal 420, as previously described, to shift the non-integer group delay τ$_g$ in the intermediate image data signal 420 to a nearest integer value, to compensate the non-integer group delay τ$_g$ and improve the image quality of the output image data signal 430 relative to the intermediate image data signal 420.

The second filter 425, or "compensation filter", configured to compensate characteristics of the intermediate image data signal 420 outputted by the CIC filter 415 as described above, may be a prototype filter h(v) for a polyphase filter. For example, the prototype filter h(v) may be configured to provide a magnitude frequency response which: compensates the gain G of the CIC filter 415; compensates the passband drop in the magnitude frequency response of the CIC filter 415; remains below the target attenuation 670 at frequencies above the cut-off frequency f$_c$ 660; and/or has low ripple in the passband f<f$_{stop}$ of the CIC filter 415; as described above.

In examples where the second filter 425 includes a polyphase filter having a series of sub-filters, as previously described, each sub-filter may be based on the prototype filter h(v). For example, each sub-filter may be designed with the same parameters as described with regards to the prototype filter h(v), but with a shifted phase φ which corresponds to the desired shift δr in the group delay of the output image data signal 430.

In the examples described above, the filters 105, 415, 425, 515 are implemented as part of an image processing apparatus. The filters 105, 415, 425, 515 can be implemented in hardware, which may be programmable and/or custom (e.g. one or more specific integrated circuits to implement the filter elements), in software, e.g. firmware, or as a combination of hardware and software. In instances where a described filter 105, 415, 425, 515 is to be implemented using software, the image processing apparatus may include storage, e.g. for storing coefficient data associated with an FIR filter 105, and a processor communicatively coupled to the storage. The storage may be, or include, at least one of volatile memory, such as a Random Access Memory (RAM), for example Static RAM (SRAM), Dynamic RAM (DRAM) or an embedded Dynamic Random Access Memory (eDRAM) or non-volatile memory, such as Read Only Memory (ROM). Alternatively or additionally, the storage may include a register file, which may be a non-volatile memory. The processor may include a microprocessor, a general purpose processor, a digital signal processor (DSP), an application specific integrated circuit (ASIC), a field programmable gate array (FPGA), a graphics processor or other programmable logic device, a discrete gate or transistor logic, discrete hardware components, or any suitable combination thereof designed to perform the functions described herein. A processor may also be implemented as a combination of computing devices, e.g. a combination of a DSP and a microprocessor, a plurality of microprocessors, one or more microprocessors in conjunction with a DSP core, or any other such configuration. The components of such an apparatus may be interconnected using a systems bus, to allow data to be transferred between the components. The apparatus may for example be or include a computing device. For example, the apparatus may be or comprise an image signal processor. The apparatus may be or comprise a system-on-a-chip. For example, the apparatus may be a self-contained, pre-programmed chip, which can be integrated with, coupled with or connected to other electronic components.

Figure 7:
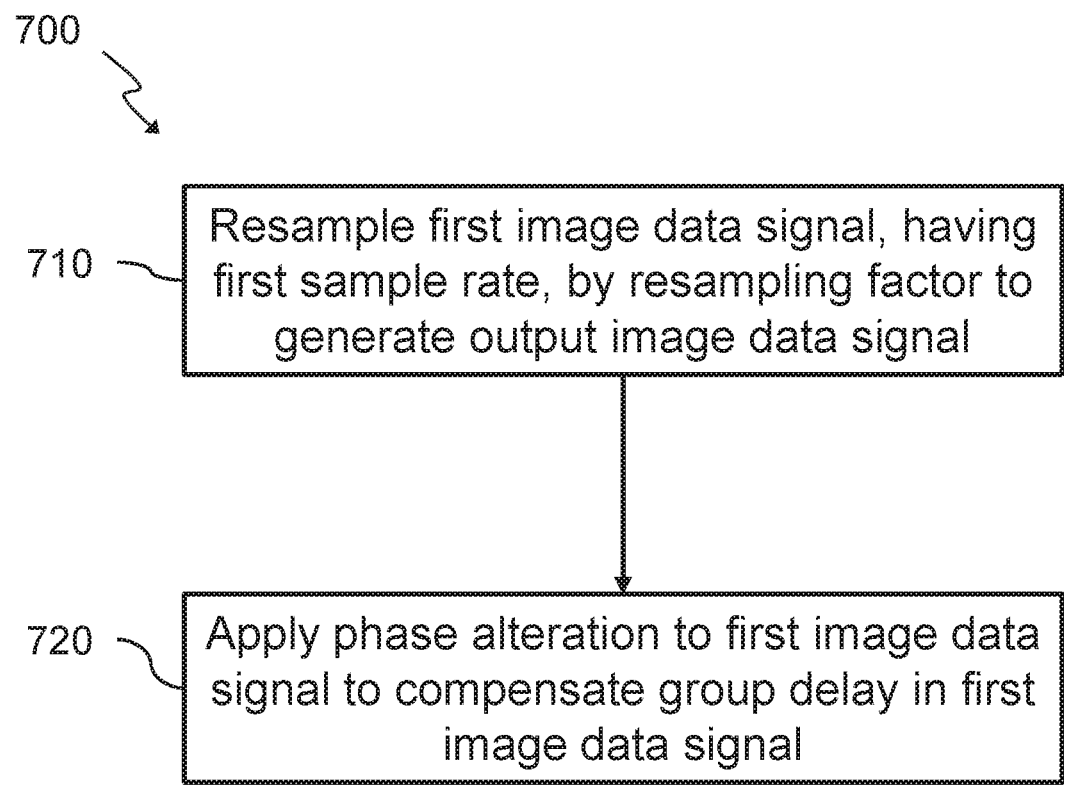
FIG. 7 shows a flow diagram illustrating an image processing method according to examples.

FIG. 7 is a flow diagram illustrating an image processing method 700 according to examples. The image processing method 700 includes, at block 710, resampling a first image data signal, having a first sample rate, by a resampling factor to generate an output image data signal having an output sample rate that is different to the first sample rate.

The method 700 also includes, at block 720, applying a phase alteration to the first image data signal to compensate a group delay in the first image data signal.

In some examples, the method 700 includes applying the phase alteration to the first image data signal to compensate a non-integer group delay in the first image data signal. For example, the method 700 may include shifting the non-integer group delay to a nearest integer group delay.

The image processing method 700 may include resampling an input image data signal, having an input sample rate, by a first resampling factor to generate the first image data signal, wherein the first sample rate is different to the input sample rate. For example, the first image data signal may be an intermediate image data signal having an intermediate sample rate.

The intermediate, or first, image data signal may be resampled by a second resampling factor to produce the output image data sample, as described above. Thus, the output image data signal may be resampled, relative to the input image data signal, by a factor comprising a product of the first and second resampling factors. The first and second resampling factors may therefore be referred to as first and second resampling sub-factors, as they are respective sub-factors of the overall resampling factor. In some cases, the first resampling sub-factor is an integer, and the second resampling sub-factor comprises a fractional part, e.g. is a non-integer.

The image processing methods 700 described herein may be performed by one or more filters, e.g. the example filters previously described. For example, the one or more filters may be implemented by hardware, software or a combination thereof, as described above. An apparatus configured to perform the image processing methods 700 described herein may include storage and a processor communicatively coupled to the storage, as explained above with reference to the filter implementations. The storage may store data or instructions for controlling the apparatus, for example components or subsystems of the apparatus, to perform the methods described herein. Such data may for example be in the form of computer readable and/or executable instructions, for example computer program instructions. As will be appreciated, though, in other examples the apparatus may be configured to perform the methods described herein via a particular, predefined hardware configuration or by a combination of hardware and software.

According to a further embodiment, there is provided an image processing apparatus including a cascaded integrator-comb (CIC) filter. The CIC filter is configured to convert an input image data signal into an output image data signal. Specifically, the CIC filter is configured to resample the input image data signal, having an input sample rate, by a resampling factor, such that the output image data signal has an output sample rate that is different to the input sample rate.

For example, the CIC filter may correspond to an example CIC filter as previously described, e.g. the CIC filter 415 examples of FIGS. 4a and 4b. In such cases, the output image data signal of the CIC filter may correspond with the intermediate image data signal 420 output by the CIC filter 415 of the previous examples. However, the CIC filter may not be followed by a compensation filter 425 in such cases.

Compared to image processing apparatuses that implement other types of FIR filter to resample image data signals, the CIC filter may provide improved architectural and computational efficiency, as previously described, particularly where the resampling factor to be applied is relatively large, e.g. having a value of 10 or more. As the target resampling factor is increased, a general FIR filter may require more multipliers, which adds to the processing and memory requirements of the FIR filter. However, the CIC filter does not include any multipliers, and so increasing the resampling factor may simply involve adjusting the operation of a sample rate changer implemented as part of the CIC filter, which does not involve all the additional processing and memory requirements of the equivalent general FIR filter.

In some examples, the image processing apparatus may include a compensation filter to compensate the output image data signal outputted by the CIC filter. In such examples, the previous description, e.g. with reference to the first and second filters 415, 425 of FIGS. 4a and 4b, applies herein.

It should be noted that the Figures are merely schematic, and that, for example, in practice illustrated functional units in the same Figure may share significant hardware circuits, even though they may be shown schematically as separate units. It will also be appreciated that each of the stages, elements and units, etc., of the Figures may be implemented as desired and will accordingly include, for example, appropriate circuitry and/or processing logic, etc., for performing the associated operation and functions.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, including the accompanying claims.

What is claimed is:

1. Image processing apparatus comprising a filter to convert a first image data signal into an output image data signal, the filter configured to:
   resample the first image data signal, having a first sample rate, by a resampling factor, such that the output image data signal has an output sample rate that is different to the first sample rate; and
   apply a phase alteration to the first image data signal to compensate a non-integer group delay in the first image data signal.

2. The image processing apparatus according to claim 1, wherein the filter comprises a polyphase filter comprising a plurality of sub-filters at different phases.

3. The image processing apparatus according to claim 2, wherein each sub-filter in the plurality of sub-filters has a respective phase, and a given sub-filter is configured to apply the phase alteration, corresponding to its respective phase, to the first image data signal to compensate the non-integer group delay in the first image data signal.

4. The image processing apparatus according to claim 3, wherein the given sub-filter is configured to apply the phase alteration to shift the non-integer group delay to a nearest integer group delay.

5. The image processing apparatus according claim 1, wherein the filter comprises a finite impulse response filter.

6. The image processing apparatus according to claim 5, wherein the finite impulse response filter is asymmetric.

7. The image processing apparatus according to claim 1, wherein the filter is a second filter and the image processing apparatus further comprises a first filter to convert an input image data signal into the first image data signal,
   wherein the first filter is configured to resample the input image data signal, having an input sample rate, by a first resampling sub-factor, such that the first sample rate is different to the input sample rate,
   wherein the second filter is configured to receive the first image data signal from the first filter, and
   wherein the resampling factor is a second resampling sub-factor, such that the output image data signal is resampled, relative to the input image data signal, by a factor comprising a product of the first and second resampling sub-factors.

8. The image processing apparatus according to claim 7, wherein the first resampling sub-factor is an integer, and wherein the second resampling sub-factor comprises a fractional part.

9. The image processing apparatus according to claim 7, wherein the first filter comprises a down-sampler to down-sample the input image data signal by the first resampling sub-factor, and
   wherein the second filter is configured to down-sample the first image data signal by the second resampling sub-factor.

10. The image processing apparatus according to claim 7, wherein the first filter comprises an up-sampler to up-sample the input image data signal by the first resampling sub-factor, and
    wherein the second filter is configured to up-sample the first image data signal by the second resampling sub-factor.

11. The image processing apparatus according to claim 7, wherein the first filter is configured to provide a first magnitude frequency response over a given frequency range, and
    wherein the second filter is configured to provide a second magnitude frequency response which comprises an inverse of the first magnitude frequency response over the given frequency range.

12. The image processing apparatus according to claim 7, wherein the first filter comprises a cascaded integrator-comb filter.

13. The image processing apparatus according to claim 12, wherein the cascaded integrator-comb filter comprises one or more integrator filter elements and a corresponding number of comb filter elements, and is configured to truncate a respective number of bits from a given image data signal after processing the given image data signal by each of the integrator and comb elements,
    wherein the respective number of bits is based on: the number of comb filter elements; the first resampling sub-factor; and a differential delay applied by each comb element.

14. The image processing apparatus according to claim 1, comprising an image signal processor.

15. The image processing apparatus according to claim 1, comprising a system-on-a-chip.

16. An image processing method comprising:
    resampling a first image data signal, having a first sample rate, by a resampling factor to generate an output image data signal having an output sample rate that is different to the first sample rate; and
    applying a phase alteration to the first image data signal to compensate a non-integer group delay in the first image data signal.

17. The image processing method according to claim 16, comprising applying the phase alteration to the first image data signal to compensate the non-integer group delay in the first image data signal by shifting the non-integer group delay to a nearest integer group delay.

18. The image processing method according to claim 16, comprising resampling an input image data signal, having an input sample rate, by a first resampling sub-factor to generate the first image data signal, wherein the first sample rate is different to the input sample rate,
    wherein the resampling factor is a second resampling sub-factor, such that the output image data signal is resampled, relative to the input image data signal, by a factor comprising a product of the first and second resampling sub-factors.

19. The image processing method according to claim 18, wherein the first resampling sub-factor is an integer, and the second resampling sub-factor comprises a fractional part.

20. Image processing apparatus comprising a cascaded integrator-comb filter to convert an input image data signal into an output image data signal,
    wherein the cascaded integrator-comb filter is configured to resample the input image data signal, having an input sample rate, by a resampling factor, such that the output image data signal has an output sample rate that is different to the input sample rate;

wherein at least one of the cascaded integrator-comb filter or a further filter of the image processing apparatus is to apply a phase alteration to the input image data signal to compensate a non-integer group delay in the input image data signal.

* * * * *